(12) United States Patent
Chang

(10) Patent No.: US 8,749,623 B2
(45) Date of Patent: Jun. 10, 2014

(54) STEREOSCOPIC DISPLAY DEVICE WITH TWO LIQUID CRYSTAL DISPLAYS

(75) Inventor: Jen-Tsorng Chang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 1068 days.

(21) Appl. No.: 12/730,255

(22) Filed: Mar. 24, 2010

(65) Prior Publication Data

US 2011/0037836 A1 Feb. 17, 2011

(30) Foreign Application Priority Data

Aug. 17, 2009 (CN) .......................... 2009 1 0305680

(51) Int. Cl.
*H04N 13/04* (2006.01)
*H04N 13/00* (2006.01)

(52) U.S. Cl.
CPC .................................. *H04N 13/0037* (2013.01)
USPC .......................................................... 348/52

(58) Field of Classification Search
CPC .................................................. H04N 13/0037
USPC .......................................................... 348/52
See application file for complete search history.

(56) References Cited

U.S. PATENT DOCUMENTS

| 5,745,197 A | 4/1998 | Leung et al. | |
|---|---|---|---|
| 7,148,859 B2 * | 12/2006 | Suyama et al. | 345/6 |
| 8,072,553 B2 * | 12/2011 | Chang | 349/15 |
| 2005/0122394 A1 * | 6/2005 | Furugoori et al. | 348/51 |
| 2010/0238366 A1 * | 9/2010 | Chang et al. | 349/15 |

FOREIGN PATENT DOCUMENTS

| CN | 1294695 A | 5/2001 |
|---|---|---|
| CN | 101187736 | 4/2010 |

\* cited by examiner

*Primary Examiner* — Sath V Perungavoor
*Assistant Examiner* — James Pontius
(74) *Attorney, Agent, or Firm* — Novak Druce Connolly Bove + Quigg LLP

(57) ABSTRACT

A stereoscopic display device is provided for displaying a 3-dimensional image including a first slice, a second slice and a third slice arranged in the order written. The stereoscopic display device includes a first LCD, a second LCD adjacent to the first LCD and a distance adjusting member. The first LCD has a first display surface. The second LCD is spaced from the first LCD. The second liquid crystal display having a second display surface facing away from the first display surface. The distance adjusting member is arranged between the first and second LCDs. The distance adjusting member is configured for reciprocally moving the first LCD relative to the second LCD between a first position where the first LCD displaying a contour of the second slice and a second position where the first LCD displaying a contour of the third slice.

9 Claims, 8 Drawing Sheets

STEREOSCOPIC DISPLAY DEVICE WITH TWO LIQUID CRYSTAL DISPLAYS

BACKGROUND

1. Technical Field

The present disclosure relates to a stereoscopic display device and a method for displaying a three-dimensional (3-D) image.

2. Description of Related Art

Objects are seen in three dimensions because light reflects from them and generates a light field in space. The two eyes of a viewer perceive this light field differently due to their positioning in space relative to the object, and the brain of the viewer processes the different perceptions of the light field by the two eyes to generate 3-D perception.

Stereoscopic imaging is one technique utilized to simulate 3-D images to viewers. Stereoscopic displays work by providing differing yet corresponding perspective images of the same object or scene to the left and right eye of the viewer. Accordingly, viewers' minds process these two images to produce a perception of three dimensions. The principles of stereoscopic imaging have been applied variously for years, including in the training of pilots and physicians, and in entertainment, 3-D movies and computer games. All stereoscopic systems rely on a legion of techniques to segregate images for the right and left eye. Typically, stereoscopic imaging systems utilize special parallax barrier screens: headgear, or eye wear to insure that the left eye sees only the left eye perspective and the right eye sees only the right eye perspective.

U.S. Pat. No. 5,745,197 issued to Leung et al, discloses a "volumetric" display intended to provide a type of 3-D images with real physical height, depth, and width by activating actual light sources at various depths within the volume of the viewer perceive various image elements at different depths within the volume of the display in perspective, thus creating a 3-D effect. The Leung et al. volumetric display utilizes a physical deconstruction of a 3-D object that entails "slicing" the object into pieces by planes oriented perpendicular to the view path of the viewer. Images corresponding to the resulting slices are then displayed superimposed on a stack of transmissive display screens (corresponding to the perpendicular slicing planes) layered at sequentially increasing distances from the viewer. The volumetric display thereby creates the appearance of a 3-D image by reproducing individual cross sections of a contoured object on a series of screens wherein images on the screens closer to the viewer are stacked on top of more distant image pieces. This essentially, is 3-D effect created in mechanical fashion. This type of volumetric display requires the layering of two or more transmissive imaging display panels to create the effect of depth, so the depth, number and distance between the various display screens on which the image slices appear limit its 3-D effect necessarily. However, the depth between each two various display screens is changeless such that the display cannot create a good 3-D effect. Additionally, large display screens mean higher associated cost.

Therefore, an stereoscopic display device which can overcome the above-mentioned problems is desired.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Various embodiments will now be described in detail below with reference to the drawings.

Figure 1:
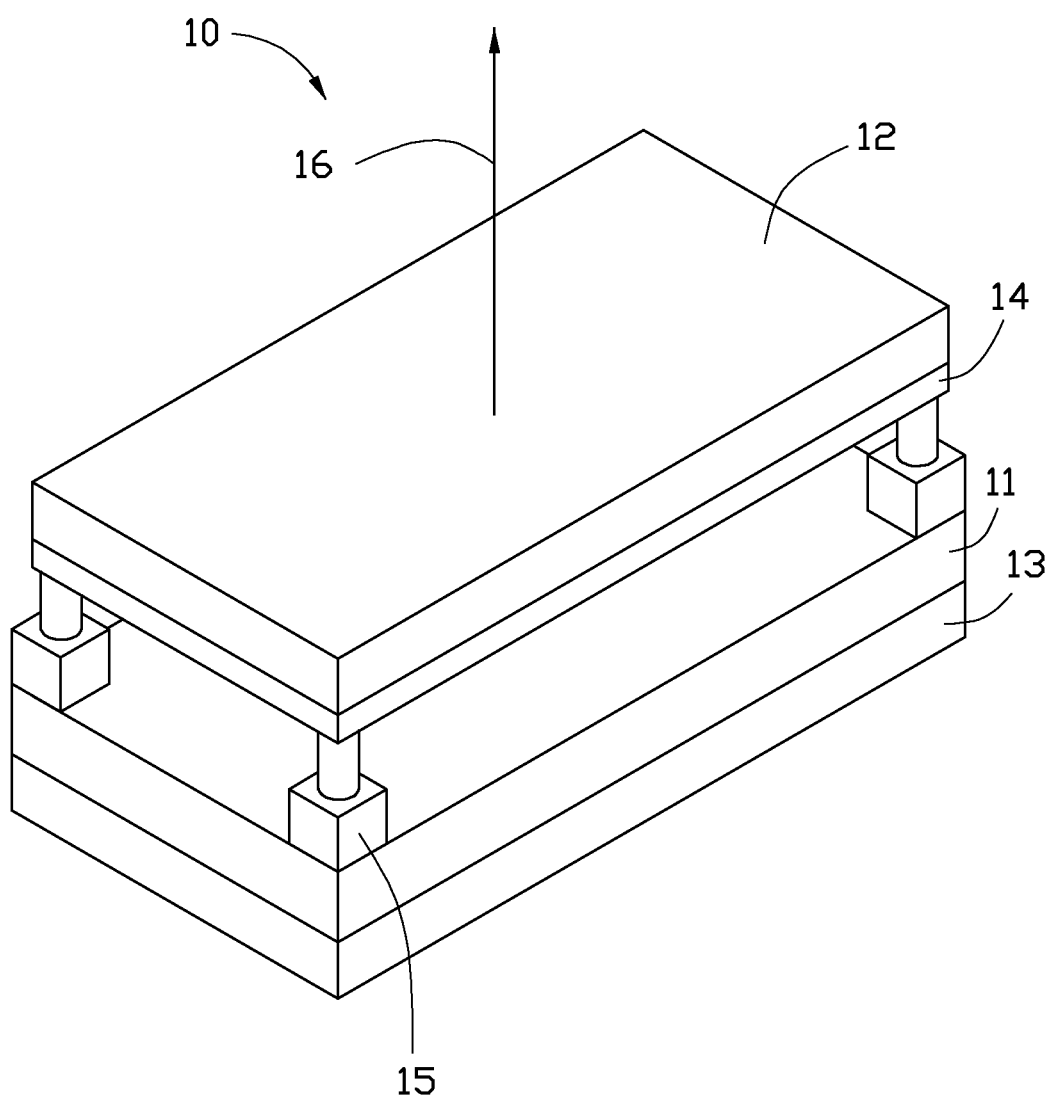
FIG. 1 is a schematic, isometric view of an stereoscopic display device in accordance with a first exemplary embodiment, the stereoscopic display device including a first LCD and a second LCD.
Figure 2:
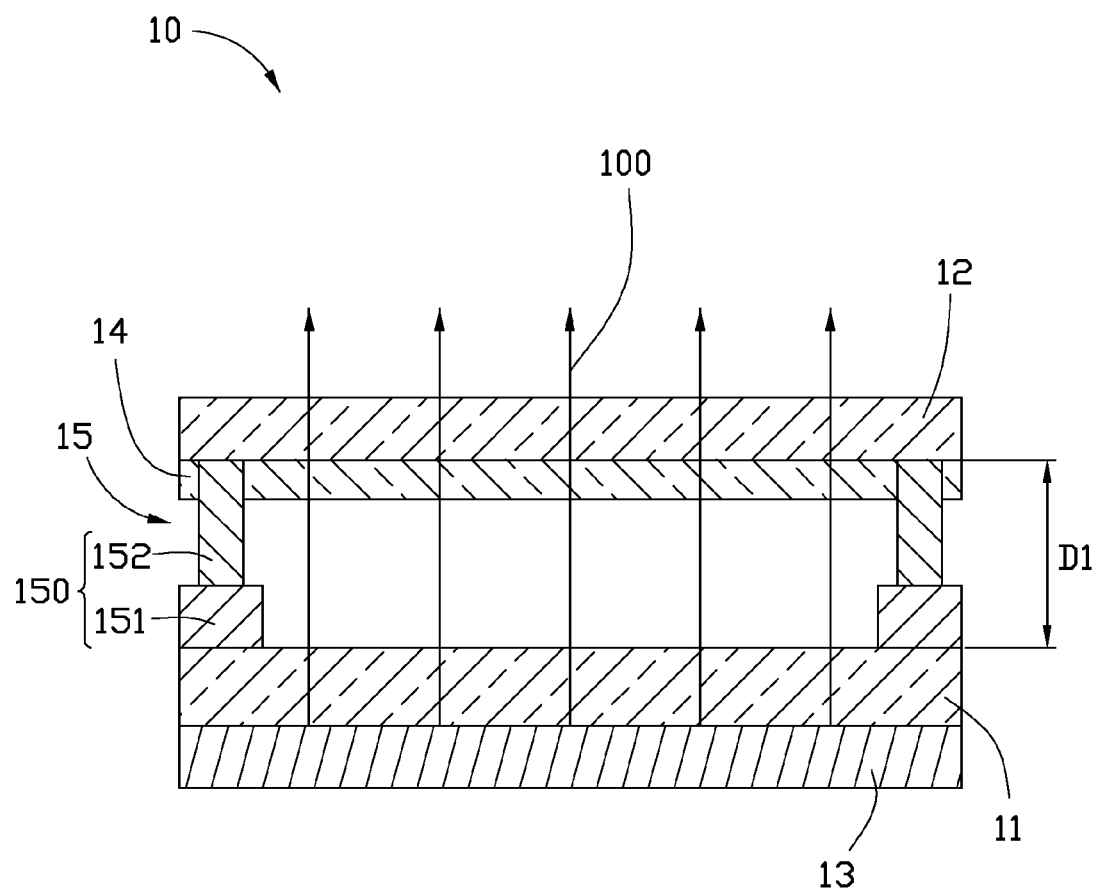
FIG. 2 is sectional view of the stereoscopic display device, showing a light path transmitting through the stereoscopic display device.

Referring to FIGS. 1 and 2, an stereoscopic display device 10 in accordance with a first exemplary embodiment includes a first LCD 11, a second LCD 12, a backlight module 13, a polarization rotation plate 14, and a distance adjusting member 15. The backlight module 13 is arranged at an opposite side of the first LCD 11 relative to the second LCD 12.

The backlight module 13 is configured for providing light to the first and second LCDs 11 and 12. The backlight module 13 can include a plurality of cold cathode fluorescence lamp and various optical plates, or include a plurality of light emitting diodes and various optical plates. As shown in FIG. 2, light rays 100 emitted from the backlight module 13 transmit through the first LCD 11, the polarization rotation plate 14 and the second LCD 12 in the described order.

It is known that, each of the first LCD 11 and second LCD 12 includes two polarizers and a liquid crystal layer between the two polarizers. The polarization rotation plate 14 is attached on a surface of the second LCD 12. The polarization rotation plate 14 is configured for rotating a polarization direction of light output from the first LCD 11 to a polarization direction substantially parallel to a polarization axis of the polarizer associated with the second LCD 12 adjacent to the first LCD 11, such that more light can transmit through the second LCD 12.

It is to be understood that, the polarizer of the first LCD 11 adjacent to the second LCD 12 or the polarizer of the second LCD 12 adjacent to the first LCD 11 is omissible. Accordingly, the polarization rotation plate 14 is omissible. The polarizer of the first LCD 11 adjacent to the second LCD 12 can also have a polarization axis parallel to that of the polarizer of the second LCD 12 adjacent to the first LCD 11. Accordingly, the polarization rotation plate 14 is omissible.

The polarization rotation plate 14 can be comprised of $Tb_2O_3$-$B_2O_3$-$Al_2O_3SiO_2$ having a magneto-optic effect. In use, a magnetic field perpendicular to the first and second LCDs 11, 12 is applied to the polarization rotation plate 14. When light is transmitted through the polarization rotation plate 14, the plane of polarization can be rotated a rotation angle $\Psi$ because of the Faraday Effect. Assuming that the magnetic field has a magnetic induction intensity B, and a thickness of the polarization rotation plate 14 is defined a distance L, the angle Ψ can be represented by the following formula: Ψ=VBL, wherein V is a verdet constant. The verdet constant V is determined by properties of the polarization rotation plate 14 and frequencies of the light transmitting through the polarization rotation plate 14. Thus, the rotation angle Ψ can vary by changing the magnetic induction intensity B and/or the distance L.

The distance adjusting member 15 can be motors, such as step motors. In this exemplary embodiment, the distance adjusting member 15 includes four step motors 150. The four step motors 150 are arranged adjacent to four corners of the first and second LCDs 11 and 12. The distance adjusting member 15 is configured for reciprocally moving the first LCD 11 relative to the second LCD 12. Each of the step motors 150 includes a stator 151 and a mover 152. One end of the stator 151 is fixed to the first LCD 11, and one end of the mover 152 is fixed to the second LCD 12. The fixing between the stator 151 and the first LCD 11 or between the mover 152 and the second LCD 12 may be achieved, for example, with transparent adhesive. The mover 152 can be regulated toward or away from the second LCD 12 by electric power, which is provided to the step motor 150. Thus the first LCD 11 is regulated toward or away from the second LCD 12. In the present embodiment, the mover 152 is an actuating shaft partly received and slidable in the stator 151. It is to be understood that the distance adjusting member 15 can also be another driving device, such as a servomotor, a voice coil motor etc.

Figure 3:
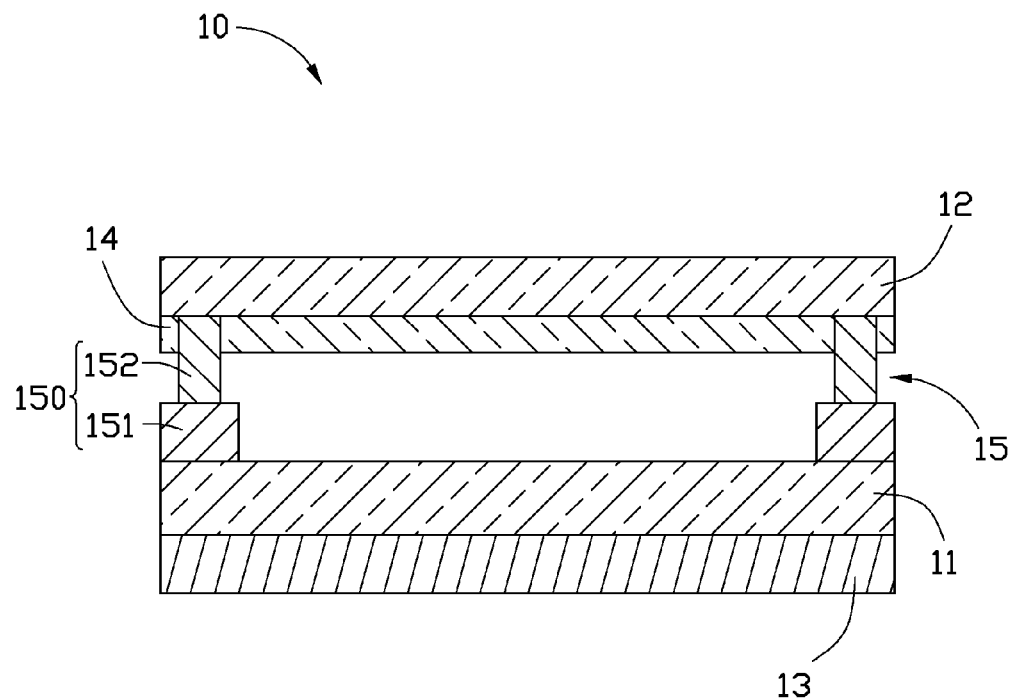
FIG. 3 is a sectional view of the stereoscopic display device in FIG. 1, showing the first LCD close to the second LCD.
Figure 4:
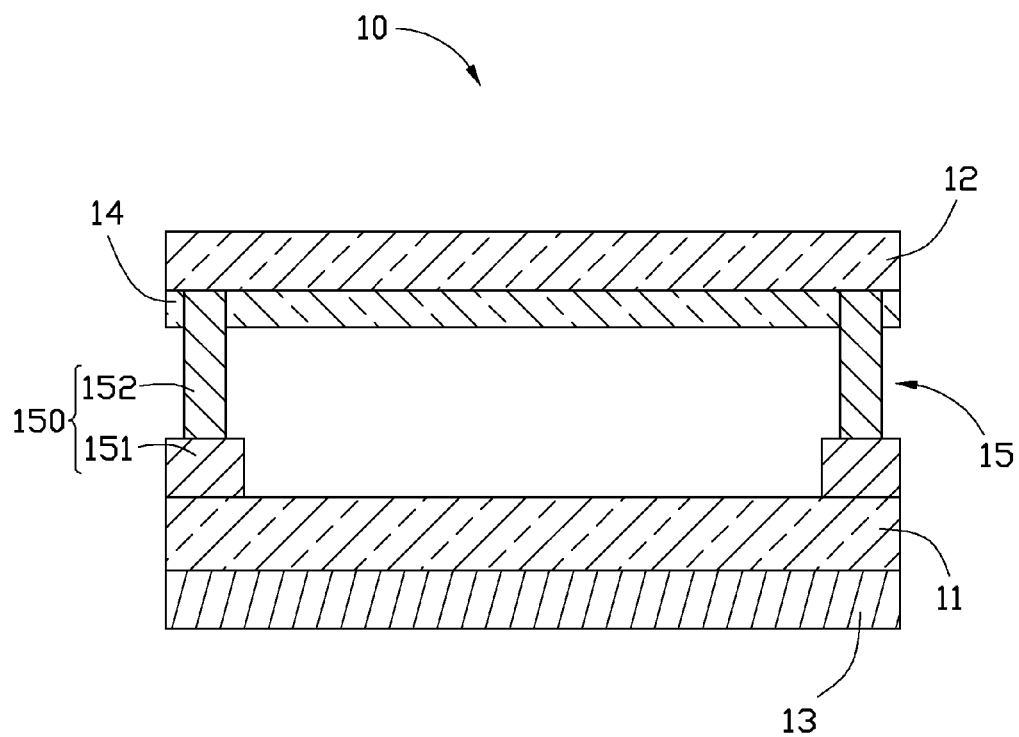
FIG. 4 is a sectional view of the stereoscopic display device in FIG. 1, showing the first LCD far from the second LCD.

Referring to FIG. 3, the first LCD 11 is moved to a first position close to the second LCD 12 by the distance adjusting member 15. Referring to FIG. 4, the first LCD 11 is moved to a second position far from the second LCD 12.

Figure 5:
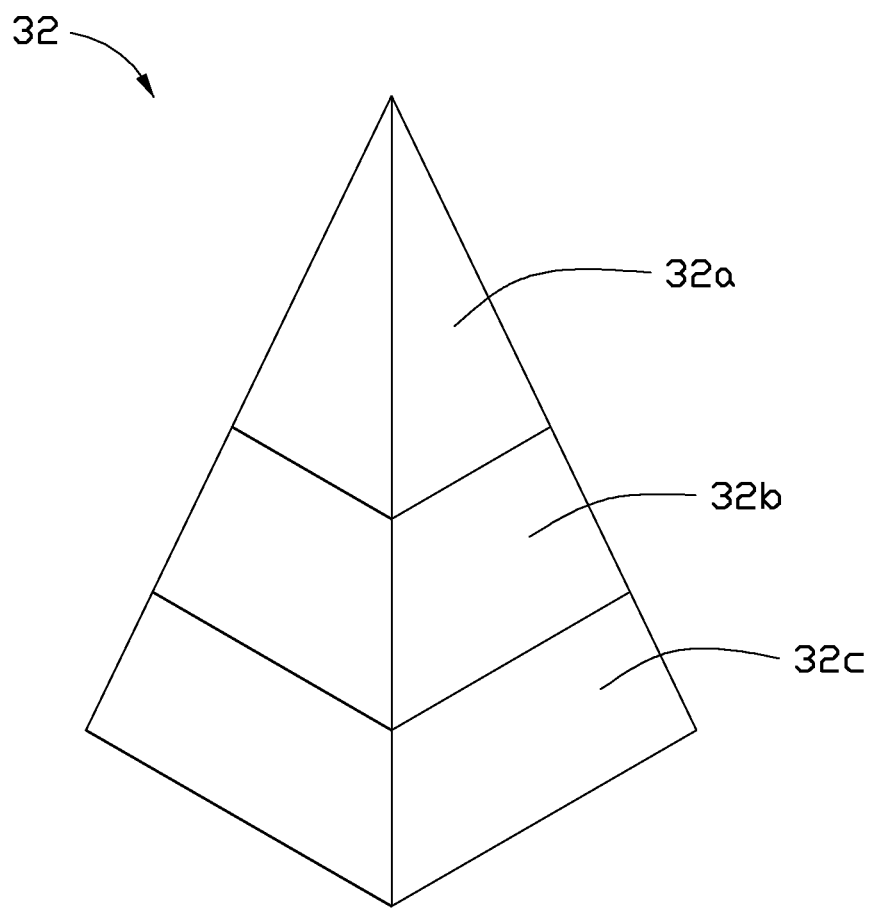
FIG. 5 illustrates a 3-D object partitioned into image slices.
Figure 6:
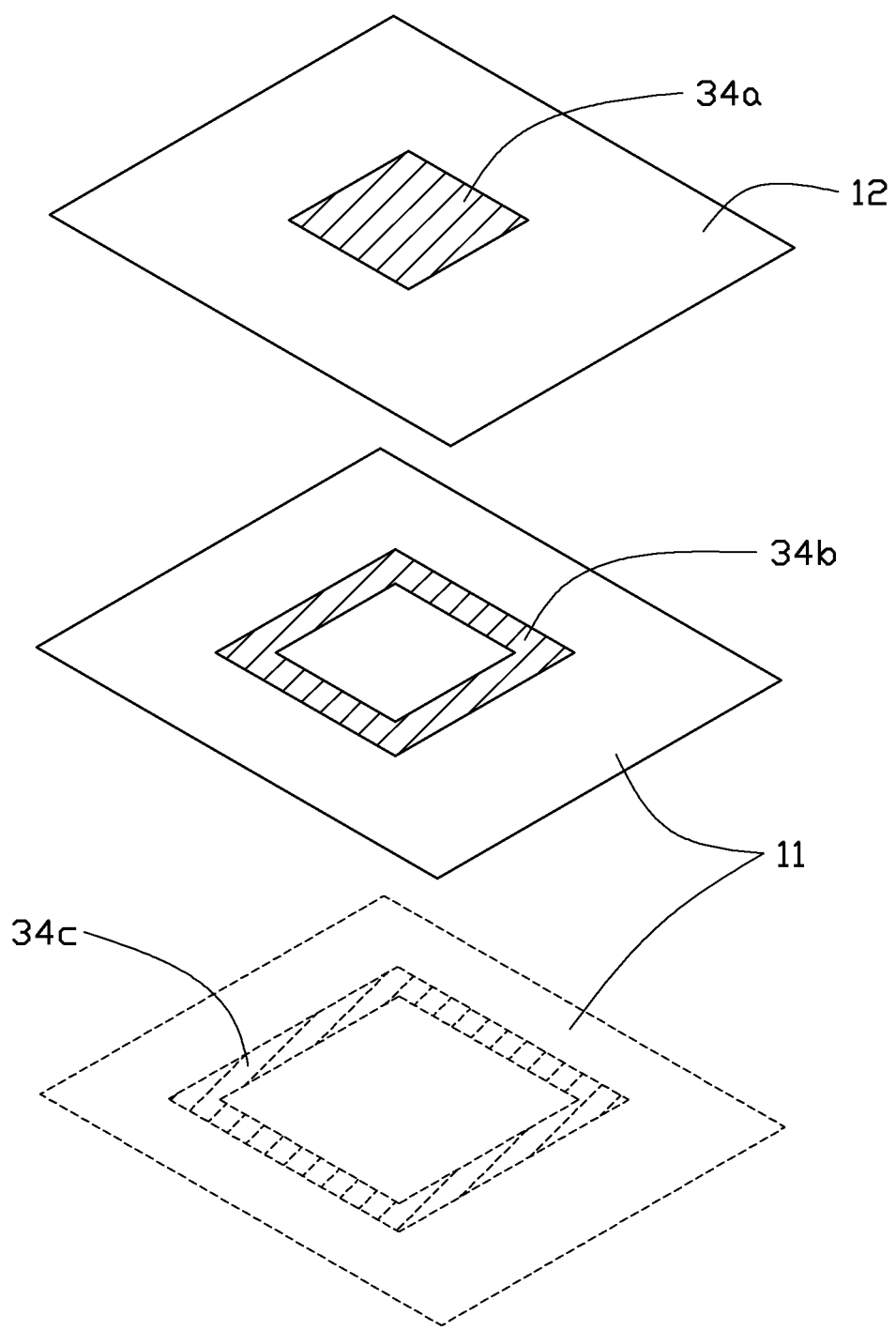
FIG. 6 illustrates the first and second LCDs in FIG. 1 with display slices displaying respective contours of respective image slices.
Figure 7:
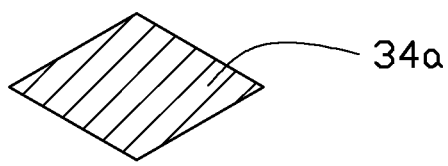
FIG. 7 illustrates the resulting displayed image of displayed contours.
Figure 7:
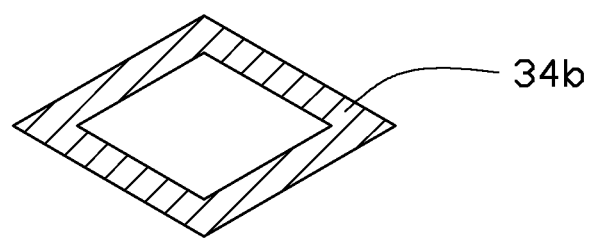
Figure 7:
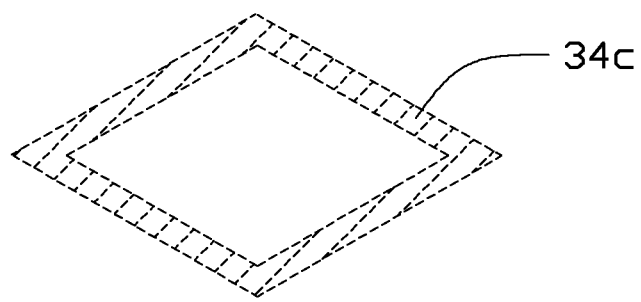

Referring also to FIGS. 5-7, stacking of LCDs 11 and 12 forms the stereoscopic display for viewing a 3-D image 32. The image 32 is preferably imaged along image slices 32a, 32b through 32c lying orthogonal along a line of sight 16 as shown in FIG. 1, which is perpendicular to the first and second LCDs 11 and 12. The second LCD 12 images a contour 34a corresponding to the slice 32a, and the first LCD 11 images contours 34b, 34c corresponding to the slices 32b, 32c. The contour 34b is displayed when the first LCD 11 is in the first position as shown in FIG. 3, and the contour 34c is displayed when the first LCD 11 is in the second position as shown in FIG. 4. The first LCD 11 is driven by the distance adjusting member 15 to move from the first position to the second position back and forth at a predetermined frequency. When the predetermined frequency is larger than a certain value, persistence of vision generates in eyes of the viewer. Generally, the predetermined frequency is at least 60 Hertz. That is, the contours 34b and 34c can be seen at the same time by the viewer because of persistence of vision in eyes of the viewer. Therefore, the LCDs 11 and 12 display respectively representing slices 32a, 32b, 32c of the 3-D image 32. When viewed as a stack, as shown in FIG. 7, the contours 34a, 34b through 34c, appear to a viewer as a solid 3-D contour image 34 comprising superimposed contour slices 34a, 34b and 34c.

The stereoscopic display device 10 has two working modes described as follows. One of the two working modes is called, page-flipping mode. In this mode, the second LCD 12, the first LCD 11 at a first position, and the first LCD at a second position display by turns at a predetermined frequency. At a time, only one of the LCDs 11 and 12 displays its corresponding image. When the first LCD 11 displays an image, the second LCD 12 is in a light-pervious state. For utilizing persistence of vision in eyes of the viewer, the predetermined frequency is higher than a certain value, generally 60 hertz.

Thus, the stereoscopic display device 10 can display a solid 3-D contour image comprising superimposed contour slices displayed by the second LCD 12 and the first LCD 11.

The other one of the two working modes is that the second LCD 12 displays its corresponding contour image all along, and the first LCD 11 displays its corresponding contour images at different positions by turns at a predetermined frequency. A portion of the first LCD 12 aligned with the contour images displayed by the first LCD 11 is in a light-pervious state. Thus, the stereoscopic display device 10 can display a solid 3-D contour image comprising superimposed contour slices displayed by the second LCD 12 and the first LCD 11.

It is to be understood that the 3-D image 32 can also be partitioned into more than three slices. Accordingly, the second LCD 12 displays the top slice, and the first LCD 11 displays the other slices. In that case, more positions are defined when the first LCD 11 is driven to move from a position close to the second LCD 12 to another position far away from the second LCD 12. In this embodiment, a distance D1 between first and second LCDs 11 and 12 can vary from 2 mm to 10 mm by virtue of the distance adjusting member 15.

The stereoscopic display device 20 includes two LCDs 11, 12 with a changeable distance therebetween. Thus, the stereoscopic display device 20 can display different depths of an image by changing the distance between the two LCDs 11, 12, thereby achieving better 3-D display effect. In addition, in the stereoscopic display device 20 of this embodiment, there is no need to arrange too many LCDs to display different depths.

Figure 8:
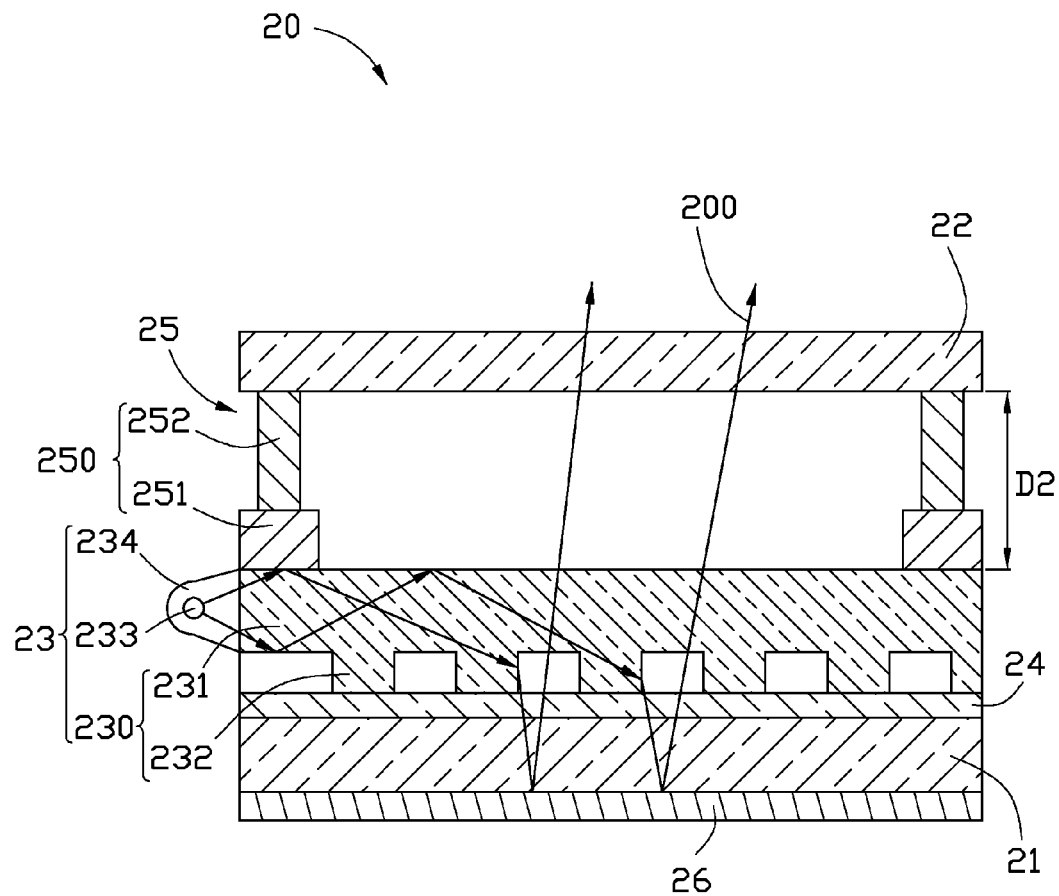
FIG. 8 is a sectional view of a volumetric display in accordance with a second exemplary embodiment.

Referring to FIG. 8, a stereoscopic display device 20 in accordance with a second exemplary embodiment includes a first LCD 21, a second LCD 22, a light source module 23, a polarization rotation plate 24, and a distance adjusting member 25. The first and second LCDs 21 and 22 are identical to the first and second LCDs 11 and 12. The light source module 23, the polarization rotation plate 24 and the distance adjusting member 25 are arranged between the first and second LCDs 21 and 22.

The light source module 23 includes a light guide plate 230, a light source 233 and a reflective cover 234. The light guide plate 230 includes a base plate 231 and a number of columnar protrusions 232 formed on a surface of the base plate 231. The columnar protrusions 232 are integrally formed with the light guide plate 230. That is, the light guide plate 230 is a single body of material comprising the base plate 231 and the columnar protrusions 232. The columnar protrusions 232 are arranged adjacent to the first LCD 21. In this embodiment, the light source 233 is a cold cathode fluorescence lamp, and positioned facing a side surface of the base plate 231. The reflective cover 234 is arranged partly surrounding the light source 233 for reflecting light emitted from the light source 233 into the base plate 231.

The reflective plate 26 is arranged on a surface of the first LCD 21 at an opposite side of the first LCD relative to the light guide plate 230. The reflective plate 26 is configured for reflecting the light emitted from the light source module 23 back to the first LCD 21. Alternatively, the reflective plate 26 can substitute a reflective film coating on a surface of the first LCD 21.

Because the base plate 231 is very thin, most of the light emitted from the light source 233 transmits in the light guide plate 231 and less outputs because of total reflection, except the light striking on the side surface of the columnar protrusions 232. The light striking on the side surface of the columnar protrusions 232 exits from the light guide plate 231 and transmits toward the reflective plate 26. Afterwards, the reflective plate 26 reflects light to the first LCD 21 whereupon the transmission goes through the light guide plate 231 and the second LCD 22. Arrows 200 in FIG. 8 illustrate the light path.

The polarization rotation device 24 is identical to the polarization rotation device 14 and configured for rotating the polarization direction of light emitted from the first LCD 21, thereby passing through the second LCD 22. The polarization rotation device 24 is arranged sandwiched between the first LCD 21 and the light guide plate 232. It is to be understood that the polarization rotation device 24 can also be arranged between the light source module 23 and the second LCD 22.

The distance adjusting member 25 is identical to the distance adjusting member 15 and includes four step motors 250. Each of the step motor 250 includes a stator 251 and a mover 252. The adjusting device 25 is arranged between the second LCD 22 and the light guide plate 230. The four step motors 250 are arranged at four corners of the second LCD 22. One end of the stator 251 is fixed on the light guide plate 230 and one end of the mover 252 is fixed on a surface of the second LCD 22. The distance adjusting member 25 is configured for driving the light guide plate 230 close to and away from the second LCD 22, thereby driving the first LCD 21 close to and away from the second LCD 22. In this embodiment, a distance D2 between the light guide plate 230 and the second LCD 22 can vary from 2 mm to 10 mm.

It is to be understood that the number of step motors 250 of the distance adjusting member 25 can vary according to need, such as less than four or more than four. The motor(s) 250 can also be arranged at the center of the first LCD 21 or the second LCD 22. The distance adjusting member 15 can also be selected from other driving devices such as a servomotor and a voice coil motor.

In addition, the number of LCDs 11 and 12 can be more than two. Accordingly, more distance adjusting members are arrangeable between two adjacent LCDs to achieve better 3-D display effect.

Referring to FIGS. 3-7 a method for displaying 3-D images using the stereoscopic display device 10 is described as follows.

Firstly, the first LCD 11 and the second LCD are provided. The second LCD 12 is parallel with the first LCD 11. The first and second LCD 11 and 12 are arranged facing a same direction.

The 3-D object 32 is partitioned into a number of slices with different depths, such as three slices 32a, 32b, 32c as shown in FIG. 5. Then the image data of slices 32a, 32b, 32c is converted into sliced contours 34a, 34b, 34c, respectively. The contour 34a is the top one of the sliced contours 34a, 34b, 34c.

Secondly, The first LCD 11 is reciprocally moved relative to the second LCD 12 between a first position close to the second LCD 12 as shown in FIG. 3 and a second position far from the second LCD 12 as shown in FIG. 4 at a predetermined frequency. The second LCD 12, which is close to the viewer, displays the contour 34a. The first LCD 11 displays the contour 34b when moved to the first position, and displays the contour 34c when moved to the second. The predetermined frequency is preferably greater than 60 hertz such that persistence of vision generates viewers' eyes. Thus, the contours 34a, 34b through 34c, when viewed as a stack, and as shown in FIG. 7, appear to a viewer as a solid 3-D contour image 34 comprising superimposed contour slices 34a, 34b and 34c. A distance between the first LCD 11 and the second LCD 12 can be changed from 2 mm to 10 mm.

Finally, it is to be understood that the above-described embodiments are intended to illustrate rather than limit the disclosure. Variations may be made to the embodiments without departing from the spirit of the disclosure. The above-described embodiments illustrate the scope of the disclosure but do not restrict the scope of the disclosure.

The invention claimed is:

1. A stereoscopic display device for displaying a 3-dimensional image including a first slice, a second slice and a third slice arranged in the order written, the first, second and third slices parallel to each other, the stereoscopic display device comprising:
a first liquid crystal display having a first display surface for displaying a contour of the second and third slices;
a second liquid crystal display spaced from the first liquid crystal display, the first display surface facing toward the second liquid crystal display, the second liquid crystal display having a second display surface facing away from the first display surface for displaying a contour of the first slice;
a backlight for illuminating the first and second liquid crystal displays; and
a plurality of motors arranged between the first and second liquid crystal displays, the motors configured for reciprocally moving the first liquid crystal display relative to the second liquid crystal display along a line of sight perpendicular to the first and second liquid crystal displays between a first position where the first liquid crystal display is configured for displaying a contour of the second slice and a second position where the first liquid crystal display is configured for displaying a contour of the third slice, the plurality of motors comprising four step motors arranged at four corners of the first and second liquid crystal displays, each of the step motors comprising a stator and a mover, the mover capable of moving toward and away from the second liquid crystal display.

2. A stereoscopic display device for displaying a 3-dimensional image including a first slice, a second slice and a third slice arranged in the order written, the first, second and third slices parallel to each other, the stereoscopic display device comprising:
a first liquid crystal display having a first display surface for displaying a contour of the second and third slices;
a second liquid crystal display spaced from the first liquid crystal display, the first display surface facing toward the second liquid crystal display, the second liquid crystal display having a second display surface facing away from the first display surface for displaying a contour of the first slice;
a backlight for illuminating the first and second liquid crystal displays, the backlight arranged between the first and second liquid crystal displays, the backlight comprising a light guide plate, a light source located adjacent to the light guide plate, and a reflective plate, the light guide plate comprising a base plate and a plurality of columnar protrusions formed on a surface of the base plate, the columnar protrusions adjacent to the first liquid crystal display, the reflective plate arranged adjacent to an opposite side of the first liquid crystal display relative to the second liquid crystal display; and
a plurality of motors arranged between the first and second liquid crystal displays, the motors configured for reciprocally moving the first liquid crystal display relative to the second liquid crystal display along a line of sight perpendicular to the first and second liquid crystal displays between a first position where the first liquid crystal display is configured for displaying a contour of the second slice and a second position where the first liquid crystal display is configured for displaying a contour of the third slice.

3. The stereoscopic display device of claim 2, wherein the plurality of motors are arranged between the second liquid crystal display and the light guide plate.

4. The stereoscopic display device of claim 2, wherein a distance between the first light guide plate and the second liquid crystal display is changeable from 2 mm to 10 mm.

5. The stereoscopic display device of claim 2, wherein the plurality of motors comprises four step motors arranged at four corners of the second liquid crystal display and the light guide plate, each of the step motors comprising a stator and a mover, the mover capable of moving toward and away from the second liquid crystal display.

6. The stereoscopic display device of claim 2, wherein the motors are configured for moving the second liquid crystal display toward and away from the first liquid crystal display at a predetermined frequency.

7. The stereoscopic display device of claim 6, wherein the predetermined frequency is at least 60 hertz.

8. The stereoscopic display device of claim 2, further comprising a polarization rotation plate for rotation of light emitted from the first liquid crystal display.

9. The stereoscopic display device of claim 8, wherein the polarization rotation plate is sandwiched between the first liquid crystal display and the light guide plate.

* * * * *